(12) United States Patent
Horng et al.

(10) Patent No.: US 10,461,601 B2
(45) Date of Patent: Oct. 29, 2019

(54) MOTOR WITH AN IMPROVED DAMP PROOF OR DUSTPROOF EFFECT

(71) Applicant: Sunonwealth Electric Machine Industry Co., Ltd., Kaohsiung (TW)

(72) Inventors: Alex Horng, Kaohsiung (TW); Sheng-Chieh Liang, Kaohsiung (TW); Yi-Sheng Chen, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 309 days.

(21) Appl. No.: 15/623,432

(22) Filed: Jun. 15, 2017

(65) Prior Publication Data

US 2018/0019637 A1    Jan. 18, 2018

(30) Foreign Application Priority Data

Jul. 18, 2016  (TW) .............................. 105122647 A

(51) Int. Cl.
*H02K 5/08* (2006.01)
*H02K 5/10* (2006.01)
*H02K 11/33* (2016.01)

(52) U.S. Cl.
CPC .............. *H02K 5/10* (2013.01); *H02K 11/33* (2016.01)

(58) Field of Classification Search
CPC ............. H02K 5/10; H02K 5/128; H02K 5/08
USPC ......................................................... 310/88
See application file for complete search history.

(56) References Cited

U.S. PATENT DOCUMENTS

| | | | | |
|---|---|---|---|---|
| 8,643,232 B2* | 2/2014 | Hung | ..................... | H02K 1/187 29/596 |
| 8,922,076 B2* | 12/2014 | Hsieh | ..................... | H02K 5/128 310/43 |
| 9,444,302 B2* | 9/2016 | Mao | ......................... | H02K 5/10 |
| 2004/0063345 A1* | 4/2004 | Oelsch | .................. | H01R 39/32 439/76.1 |
| 2004/0119350 A1* | 6/2004 | Miya | ..................... | H02K 3/522 310/71 |
| 2005/0162026 A1* | 7/2005 | McCain | .................. | H02K 5/10 310/88 |

(Continued)

FOREIGN PATENT DOCUMENTS

EP             2023466 A1    2/2009

*Primary Examiner* — Alexander Talpalatski
(74) *Attorney, Agent, or Firm* — Alan D. Kamrath; Mayer & Williams PC

(57) ABSTRACT

A motor is provided to improve the damp proof or dustproof effect of the conventional motor. The motor includes an isolating housing, a sealing member and an inner assembly. The isolating housing includes first and second housing parts. A through-hole is formed between the first and second housing parts. The through-hole communicates an internal space of the isolating housing with an external space. The sealing member includes a frame portion and a wire receiving portion. The wire receiving portion is integrally formed with the frame portion. The frame portion is arranged between the first and second housing parts. The wire receiving portion is disposed at the through-hole. A lead wire is received in the wire receiving portion, and includes one end extending into the internal space of the isolating housing. The inner assembly is received in the internal space of the isolating housing and electrically connected to the lead wire.

14 Claims, 5 Drawing Sheets

(56) References Cited

U.S. PATENT DOCUMENTS

2015/0204478 A1* 7/2015 Hsu ...................... A47J 37/041
                                                    310/88

* cited by examiner

MOTOR WITH AN IMPROVED DAMP PROOF OR DUSTPROOF EFFECT

CROSS REFERENCE TO RELATED APPLICATIONS

The application claims the benefit of Taiwan application serial No. 105122647, filed on Jul. 18, 2016, and the subject matter of which is incorporated herein by reference.

BACKGROUND OF THE INVENTION

1. Field of the Invention

The present disclosure generally relates to a motor and, more particularly, to a motor having an isolating housing.

2. Description of the Related Art

In a conventional motor, the stator and some rotor components (which are referred to as "inner assembly" hereinafter) are received in an isolating housing to isolate these elements from external moisture and foreign debris. The isolating housing generally includes a first housing part and a second housing part that can be combined to and removed from each other. A pad is arranged at where the first and second housing parts are connected to each other. The pad can enhance the sealing effect between the first and second housing parts. As such, the inner assembly can have better damp proof or dustproof effect.

In such a motor, the isolating housing needs to form a through-hole through which a lead wire of the inner assembly can extend. However, the moisture or dust can enter the isolating housing via the through-hole, affecting the damp proof or dustproof effect of the isolating housing.

In light of the deficiency, it is necessary to improve the conventional motor.

SUMMARY OF THE INVENTION

It is therefore the objective of this disclosure to provide a motor in which the isolating housing of the motor includes a through-hole but is still able to provide the desired damp proof or dustproof effect.

In an embodiment of the disclosure, a motor including an isolating housing, a sealing member and an inner assembly is disclosed. The isolating housing includes a first housing part and a second housing part. The first and second housing parts are capable of being combined with and detached from each other. A through-hole is formed between the first and second housing parts. The through-hole communicates an internal space of the isolating housing with an external space. The sealing member includes a frame portion and a wire receiving portion. The wire receiving portion is integrally formed with an outer periphery of the frame portion. The frame portion is arranged between the first and second housing parts. The wire receiving portion is disposed at the through-hole. A lead wire is received in the wire receiving portion. The lead wire has one end extending into the internal space of the isolating housing. The inner assembly is received in the internal space of the isolating housing and electrically connected to the lead wire.

Based on this, in the motor of the disclosure, the sealing member can completely fill the gap between the first and second housing parts without affecting the positioning of the lead wire. Advantageously, the desired damp proof or dustproof effect can be provided to the inner assembly.

The isolating housing includes at least one first positioning portion at the through-hole. The wire receiving portion includes at least one second positioning portion arranged on an outer periphery thereof. The at least one second positioning portion can be respectively engaged with the at least one first positioning portion. This structure can enhance the engaging effect between the isolating housing and the sealing member.

Each of the first and second housing parts includes a connecting edge. The connecting edge of each of the first and second housing parts forms a bottom wall at the through-hole. The at least one first positioning portion is formed on the bottom wall of the connecting edge of the first or second housing part. This structure can provide a convenient manufacturing.

In a form shown, the at least one first positioning portion includes two first positioning portions. One of the two first positioning portions is formed on the bottom wall of the connecting edge of the first housing part, and another of the two first positioning portions is formed on the bottom wall of the connecting edge of the second housing part. The at least one second positioning portion includes two second positioning portions corresponding to the two first positioning portions. The structure permits the wire receiving portion to couple with both the first and second housing parts, enhancing the positioning effect of the wire receiving portion.

In another form shown, the at least one first positioning portion includes four first positioning portions. Two of the four first positioning portions are formed on the bottom wall of the connecting edge of the first housing part and are spaced from each other with respect to the frame portion, and another two of the four first positioning portions are formed on the bottom wall of the connecting edge of the second housing part and are spaced from each other with respect to the frame portion. The at least one second positioning portion includes four second positioning portions corresponding to the four first positioning portions. The structure permits the wire receiving portion to couple with both the first and second housing parts, enhancing the positioning effect of the wire receiving portion.

The wire receiving portion includes a positioning head and a sleeve. The positioning head is connected to an outer periphery of the sleeve. The at least one second positioning portion is arranged on the positioning head, and the lead wire is received in the sleeve. This structure can provide a convenient assembly.

The positioning head is integrally formed with the sleeve. This structure enhances the coupling effect and provides a convenient assembly.

The positioning head includes a terminal wall at one end of the positioning head facing the internal space of the isolating housing, and the terminal wall is connected to the frame portion and covers the through-hole. This structure can enhance the damp proof or dustproof effect.

The sleeve includes one end extending out of the terminal wall of the positioning head and extending into the internal space of the isolating housing. This structure can enhance the coupling effect between the sleeve and the positioning head.

The wire receiving portion includes a positioning head. The lead wire is partially received in the positioning head. The at least one second positioning portion is arranged on an outer periphery of the positioning head. This structure can improve the convenience in assembly.

The positioning head is integrally formed with an outer periphery of the lead wire. This structure can enhance the coupling effect and the damp proof/dustproof effect, and improve the convenience in assembly.

Each of the at least one first positioning portion is in a form of a tongue, and each of the at least one second positioning portion is in a form of a notch. Each of the at least one first positioning portion is engaged into a respective one of the at least one second positioning portion. This structure is simple, and is easy for manufacturing and assembly, thus improving the convenience in assembly and enhancing the damp proof/dustproof effect.

The isolating housing further includes a partition mounted in the first housing part. A circuit chamber is formed between the partition and the second housing part. The circuit chamber communicates with the through-hole. The inner assembly includes a circuit board coupled to the partition and located in the circuit chamber. This structure can improve the convenience in assembly.

The motor further includes a shaft extending through the first housing part and connected to the inner assembly. The frame portion includes rectangular or trapezoid cross sections parallel to an axis of the shaft. This structure can improve the convenience in assembly.

BRIEF DESCRIPTION OF THE DRAWINGS

The present disclosure will become more fully understood from the detailed description given hereinafter and the accompanying drawings which are given by way of illustration only, and thus are not limitative of the present disclosure, and wherein.

Figure 1:
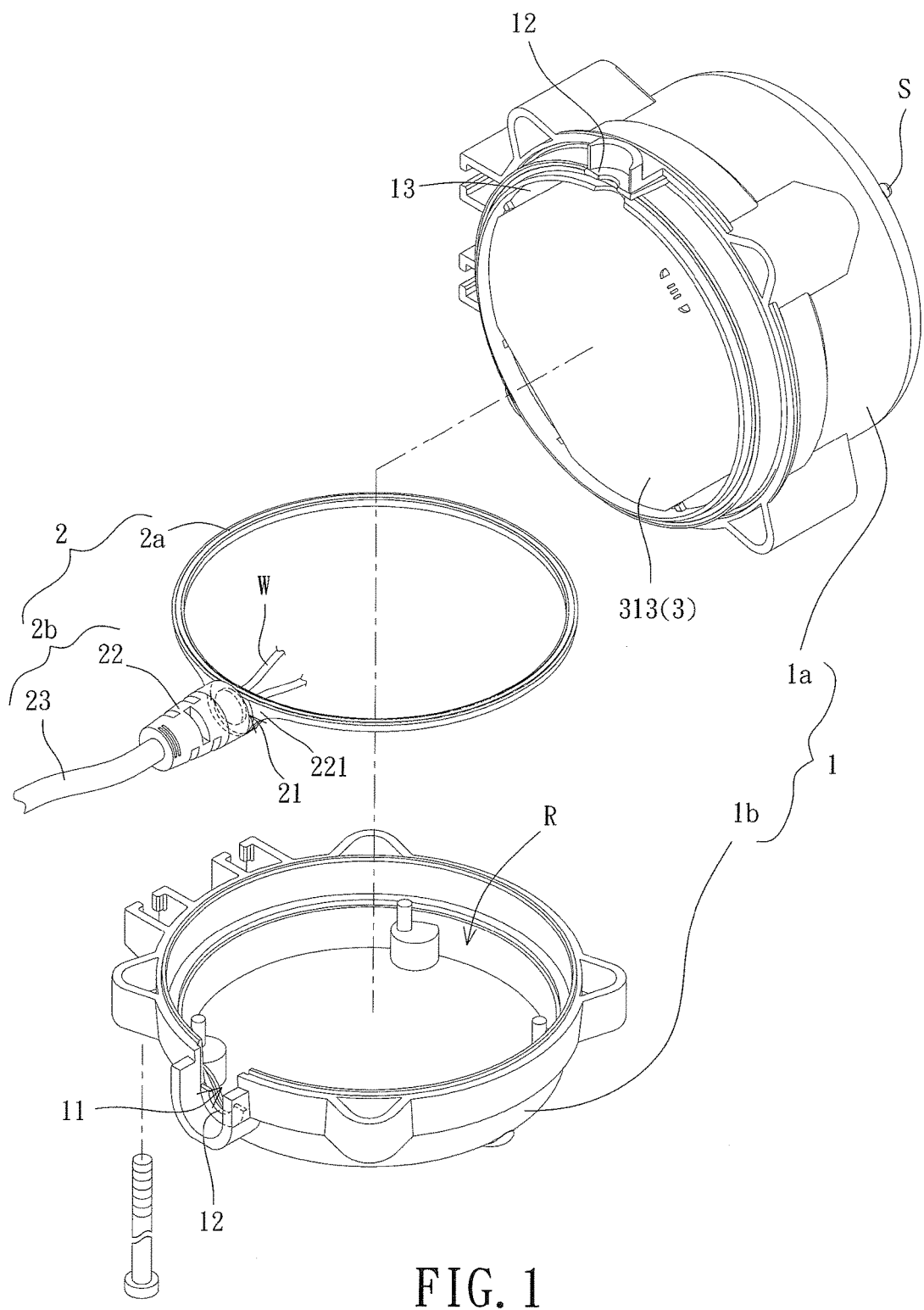
FIG. 1 shows an exploded view of a motor according to a first embodiment of the disclosure.

In the various figures of the drawings, the same numerals designate the same or similar parts. Furthermore, when the terms "first", "second", "inner", "outer", "top", "bottom" and similar terms are used hereinafter, it should be understood that these terms have reference only to the structure shown in the drawings as it would appear to a person viewing the drawings, and are utilized only to facilitate describing the disclosure.

DETAILED DESCRIPTION OF THE INVENTION

Figure 2:
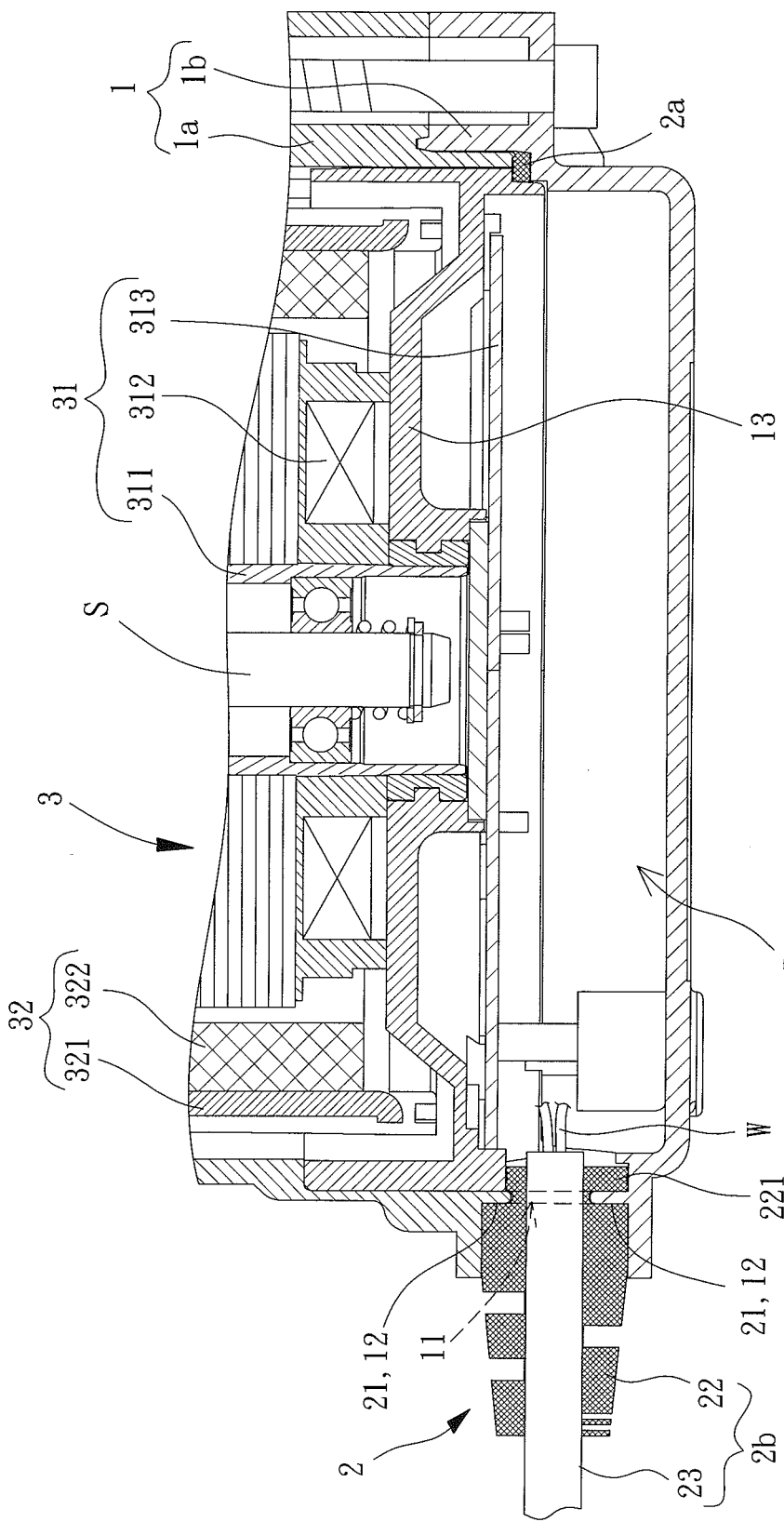
FIG. 2 is a partially, cross sectional view of the motor of the first embodiment of the disclosure.

FIGS. 1 and 2 show a motor according to an embodiment of the disclosure. The motor includes a separable isolating housing 1, a sealing member 2 and an inner assembly 3. The sealing member 2 is arranged at a connected part of the isolating housing 1. The inner assembly 3 is received in the isolating housing 1.

Specifically, the material and shape of the isolating housing 1 are not limited. The isolating housing 1 may include a first housing part 1a and a second housing part 1b. The first and second housing parts 1a and 1b can be combined with and detached from each other. Each of the first and second housing parts 1a and 1b includes a connecting edge facing the connecting edge of the other housing part. Each connecting edge forms a notch. Thus, when the first and second housing parts 1a and 1b are combined with each other, a through-hole 11 can be formed between the first and second housing parts 1a and 1b. Based on the through-hole 11, the internal space of the isolating housing 1 can communicate with the external space. In the embodiment, the first housing part 1a includes an end face most distant to the second housing part 1b, and a hole is provided on the end face. The shaft S extends through the hole of the first housing part 1a so that it can connect to the inner assembly 3 inside the isolating housing 1.

Figure 3:
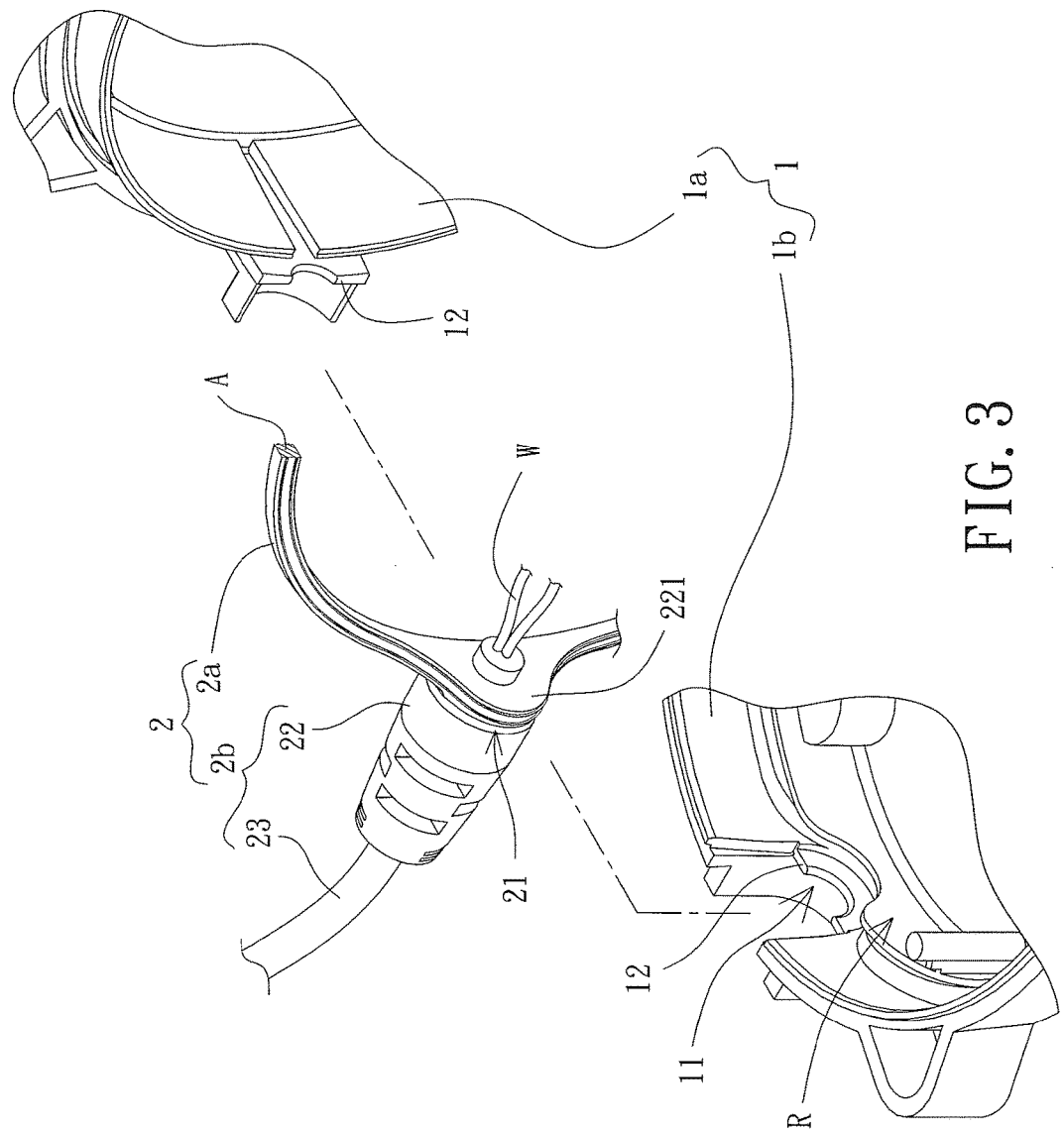
FIG. 3 is a partially, exploded view of the motor of the first embodiment of the disclosure.
Figure 4:
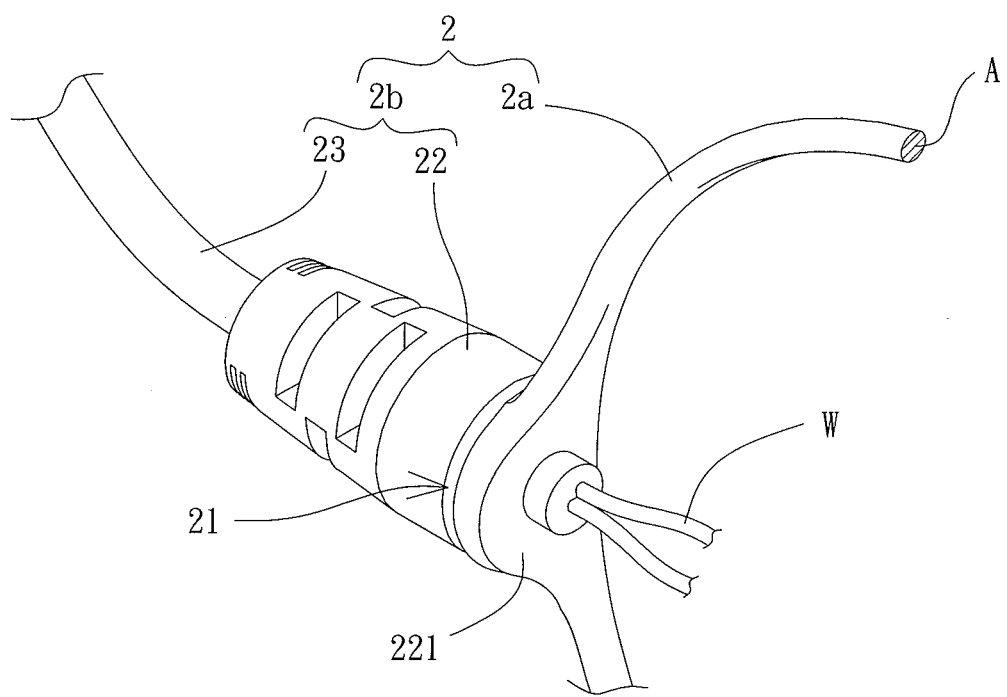
FIG. 4 is the partial view of the motor of the first embodiment of the disclosure after the parts are assembled.

The sealing member 2 is made of an elastic material, such as rubber, silicon, ethylene-vinyl acetate (EVA). The sealing member 2 includes a frame portion 2a and a wire receiving portion 2b. The wire receiving portion 2b is integrally formed with the outer periphery of the frame portion 2a. A lead wire W is received in the wire receiving portion 2b. The frame portion 2a is arranged between the first and second housing parts 1a and 1 b, such that the frame portion 2a can be clamped by the connecting edges of the first and second housing parts 1a and 1b. In this regard, when the first and second housing parts 1a and 1b are combined to each other, the gap between the first and second housing parts 1a and 1b other than the through-hole 11 is filled by the elastic frame portion 2a. Thus, the sealing effect between the first and second housing parts 1a and 1b can be enhanced. Accordingly, the frame portion 2a should be designed in the same shape as the connecting edges of the frame portion 2a, such as a circular shape, a rectangular shape or any other shape as it can be readily appreciated by the skilled person. The frame portion 2a may have rectangular cross sections A parallel to an axis of the shaft S, as is shown in FIG. 3. The cross sections A of the frame portion 2a may also have a trapezoid shape, a polygonal shape or any other shape. In addition, the cross sections A of the frame portion 2a may also have a circular shape as shown in FIG. 4, or an oval shape. Preferably, the cross sections A of the frame portion 2a may have a rectangular or trapezoid shape in order to prevent the frame portion 2a from twisting inside out when experiencing an external force. As such, the frame portion 2a will not easily disengage from between the first and second housing parts 1a and 1 b, attaining a convenient assembly.

Referring to FIGS. 1 and 2 again, when the frame portion 2a is clamped by the connecting edges of the first and second housing parts 1a and 1b, the wire receiving portion 2b may align with the through-hole 11. As such, the outer periphery of the wire receiving portion 2b may seal the through-hole 11. Based on this, one end of the lead wire W in the wire receiving portion 2b may extend into the interior of the isolating housing 1 and electrically connect to the inner assembly 3. Thus, the inner assembly 3 can be connected to the external power.

Based on the above, the sealing member 2 can completely fill the gap between the first and second housing parts 1a and 1b without affecting the lead wire W, including the through-hole 11. Therefore, the external moisture and foreign debris cannot enter the isolating housing 1 via the gap between the first and second housing parts 1a and 1b and the through-hole 11. The desired damp proof or dustproof effect is provided. In particular, the frame portion 2a is integrally formed with the wire receiving portion 2b so that no gap will be formed between the frame portion 2a and the wire receiving portion 2b, preventing the liquid from flowing into the isolating housing 1. Due to this structure, the motor of the disclosure had passed high standard of watertight tests.

Based on the above structure, the motor of the disclosure further includes the following detailed structures to provide a better sealing effect.

The isolating housing 1 in this embodiment may include at least one first positioning portion 12 at the through-hole 11. The wire receiving portion 2b includes at least one second positioning portion 21 at the part of the outer periphery of the wire receiving portion 2b adjacent to the isolating housing 1. The at least one second positioning portion 21 corresponds to the at least one first positioning portion 12 in quantity and shape. Therefore, each corresponding pair of the first positioning portion 12 and second positioning portion 21 can be engaged with each other to securely fix the wire receiving portion 2b at the through-hole 11. In a non-limiting example, the first positioning portion 12 may be in the form of a tongue, and the second positioning portion 21 may be in the form of a notch corresponding to the tongue. In this arrangement, the first positioning portion 12 can be engaged into the second positioning portion 21 to position the wire receiving portion 2b while preventing entrance of the external moisture and foreign debris, attaining a better damp proof or dustproof effect.

The through-hole 11 is formed on the connecting edges of the first and second housing parts 1a and 1b. The connecting edge of each of the first and second housing parts 1a and 1b forms a bottom wall at the through-hole 11. The first positioning portion 12 may be arranged on the bottom wall of the first housing part 1a or the second housing part 1b. When the at least one first positioning portion 12 includes a plurality of first positioning portions 12 such as two first positioning portions 12, one of the first positioning portions 12 can be arranged on the bottom wall of the first housing part 1a and the another of the first positioning portions 12 can be arranged on the bottom wall of the second housing part 1b. In this case, both the first and second housing parts 1a and 1b include one first positioning portion 12 at the through-hole 11, and the wire receiving portion 2b also includes two second positioning portions 21 corresponding to the two first positioning portions 12. As such, the wire receiving portion 2b can connect to the first and second housing parts 1a and 1b to enhance the positioning effect of the wire receiving portion 2b.

Figure 5:
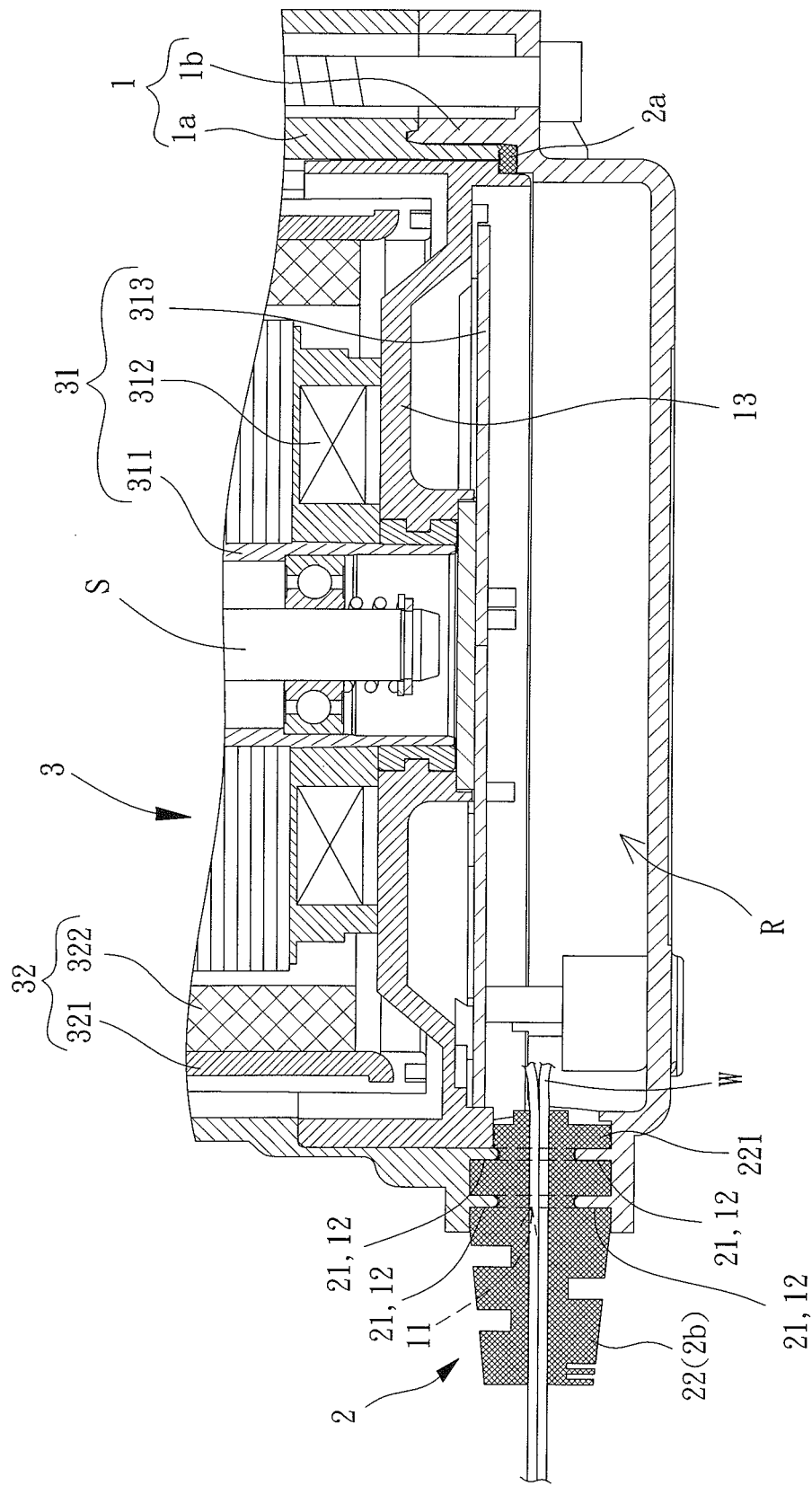
FIG. 5 is a partially, cross sectional view of a motor according to another embodiment of the disclosure.

In particular, referring to FIG. 5, the first housing part 1a preferably includes two first positioning portions 12 and the second housing part 1b preferably includes two second positioning portions 21. The two first positioning portions 12 on each of the first and second housing parts 1a and 1b are spaced from each other with respect to the lateral surface of the frame portion 2a. The wire receiving portion 2b also includes two second positioning portions 21 corresponding to the two first positioning portions 12. In this arrangement, the wire receiving portion 2b can be securely fixed at the through-hole 11 of the isolating housing 1. When the wire receiving portion 2b experiences a pulling force, the majority of the force goes to the isolating housing 1 and only a small portion of the force goes to the frame portion 2a. Thus, the wire receiving portion 2b will not easily break or come off the isolating housing 1 when experiencing the pulling force. Also, the positioning of the frame portion 2a is not largely affected, thereby reinforcing the coupling strength between the sealing member 2 and the isolating housing 1.

Referring to FIGS. 2 and 3, in order to reinforce the coupling strength between the wire receiving portion 2b and the isolating housing 1 without affecting the positioning of the lead wire W, the wire receiving portion 2b can further include a positioning head 22 and a sleeve 23. The positioning head 22 is connected to the outer periphery of the sleeve 23. The second positioning portion(s) 21 is arranged on the positioning head 22. The lead wire W is received in the sleeve 23. The positioning head 22 can be integrally formed with the sleeve 23 to improve the coupling effect therebetween as well as to provide a convenient manufacturing. The sleeve 23 can also be integrally formed with the lead wire W to provide the damp proof or dustproof effect.

The positioning head 22 includes a terminal wall 221 at one end of the positioning head 22 facing the interior of the isolating housing 1. The terminal wall 221 is connected to the frame portion 2a. When the wire receiving portion 2b is coupled with the isolating housing 1, the terminal wall 221 can cover the through-hole 11 to improve the damp proof or dustproof effect. Besides, one end of the sleeve 23 can extend out of the terminal wall 221 of the positioning head 22. Thus, the end of the sleeve 23 can extend into the interior of the isolating housing 1 so that the sleeve 23 and the positioning head 22 can have the largest coupling area therebetween, ensuring a secure coupling effect between the sleeve 23 and the positioning head 22.

Referring to FIG. 5, the sleeve 23 can be omitted in another embodiment. In such an embodiment, the lead wire W is partially received in the positioning head 22. The positioning head 22 is preferably integrally formed with the outer periphery of the lead wire W to provide a secure coupling effect therebetween as well as a convenient manufacturing. This also prevents the dust from accumulating inside the positioning head 22 and prevents the moisture from intruding into the isolating housing 1 via the inner space of the positioning head 22. Thus, the damp proof or dustproof effect is provided.

Referring to FIGS. 1 and 2 again, the isolating housing 1 in the embodiment may further include a partition 13 in order to provide a convenient assembly and to securely position the inner assembly 3 in the desired location in the isolating housing 1. The partition 13 is mounted in the first housing part 1a so that a stator 31 of the inner assembly 3 can be positioned on the partition 13. With the partition 13, a circuit chamber R is formed between the partition 13 and the second housing part 1b. The circuit chamber R communicates with the through-hole 11. The stator 31 includes a shaft tube unit 311, a coil unit 312 and a circuit board 313. The shaft tube unit 311 may be fixed to the partition 13. The shaft tube unit 311 extends at one side of the partition 13 so that it locates in the first housing part 1a. As such, the coil unit 312 can be coupled with the outer periphery of the shaft tube unit 311. The circuit board 313 may be coupled to the other face of the partition 13 and is located in the circuit chamber R for connection to the lead wire W. As such, the circuit board 313 may be electrically connected to the external power source.

The inner assembly 3 further includes a rotor 32 having a hub 321 and a permanent magnet unit 322. The hub 321 is coupled to the outer periphery of the shaft S. The shaft S is rotatably received in the shaft tube unit 311 of the stator 31. The permanent magnet unit 322 is coupled to the inner periphery of the hub 321 and faces the coil unit 312. Besides, the external power source can supply electric currents to the coil unit 312 via the circuit board 313, thus generating an alternating magnetic field that drives the rotor 32 and the shaft S to rotate.

In the first step of the assembly, the inner assembly 3 can be mounted to the partition 13. In the second step, the partition 13 is placed into of the first housing part 1a in a manner that the outer periphery of the partition 13 abuts with the first housing part 1a. In third step, the sealing member 2 is attached to the first housing part 1a, and the second housing part 1b is combined to the first housing part 1a. The first housing part 1a and the second housing part 1b are screwed together. Based on this, the assembly procedure of the motor of the disclosure is simple and easy, attaining a convenient and efficient assembly.

Based on the above, since the sealing member 2 in the motor of the disclosure includes the wire receiving portion, the gap between the first and second housing parts can be completely filled by the sealing member without affecting the positioning of the lead wire. Advantageously, the desired damp proof or dustproof effect can be provided to the inner assembly.

Although the disclosure has been described in detail with reference to its presently preferable embodiments, it will be understood by one of ordinary skill in the art that various modifications can be made without departing from the spirit and the scope of the disclosure, as set forth in the appended claims.

What is claimed is:

1. A motor comprising:
   an isolating housing comprising a first housing part and a second housing part, wherein the first and second housing parts are capable of being combined with and detached from each other, wherein a through-hole is formed between the first and second housing parts, wherein the through-hole communicates an internal space of the isolating housing with an external space;
   a sealing member comprising a frame portion and a wire receiving portion, wherein the wire receiving portion is integrally formed with an outer periphery of the frame portion, wherein the frame portion is arranged between the first and second housing parts, wherein the wire receiving portion is disposed at the through-hole, wherein a lead wire is received in the wire receiving portion, and wherein the lead wire has one end extending into the internal space of the isolating housing; and
   an inner assembly received in the internal space of the isolating housing and electrically connected to the lead wire.

2. The motor as claimed in claim 1, wherein the isolating housing comprises at least one first positioning portion at the through-hole, wherein the wire receiving portion comprises at least one second positioning portion arranged on a part of an outer periphery of the wire receiving portion adjacent to the isolating housing, and wherein the at least one second positioning portion is adapted to respectively engage with the at least one first positioning portion.

3. The motor as claimed in claim 2, wherein each of the first and second housing parts comprises a connecting edge, wherein the connecting edge of each of the first and second housing parts forms a bottom wall at the through-hole, and wherein the at least one first positioning portion is formed on the bottom wall of the connecting edge of the first or second housing part.

4. The motor as claimed in claim 2, wherein the at least one first positioning portion comprises two first positioning portions, wherein one of the two first positioning portions is formed on the bottom wall of the connecting edge of the first housing part, wherein another of the two first positioning portions is formed on the bottom wall of the connecting edge of the second housing part, wherein the at least one second positioning portion comprises two second positioning portions corresponding to the two first positioning portions.

5. The motor as claimed in claim 2, wherein the at least one first positioning portion comprises four first positioning portions, wherein two of the four first positioning portions are formed on the bottom wall of the connecting edge of the first housing part and are spaced from each other with respect to the frame portion, wherein another two of the four first positioning portions are formed on the bottom wall of the connecting edge of the second housing part and are spaced from each other with respect to the frame portion, and wherein the at least one second positioning portion comprises four second positioning portions corresponding to the four first positioning portions.

6. The motor as claimed in claim 2, wherein the wire receiving portion comprises a positioning head and a sleeve, wherein the positioning head is connected to an outer periphery of the sleeve, wherein the at least one second positioning portion is arranged on the positioning head, and wherein the lead wire is received in the sleeve.

7. The motor as claimed in claim 6, wherein the positioning head is integrally formed with the sleeve.

8. The motor as claimed in claim 6, wherein the positioning head comprises a terminal wall at one end of the positioning head facing the internal space of the isolating housing, and wherein the terminal wall is connected to the frame portion and covers the through-hole.

9. The motor as claimed in claim 8, wherein the sleeve comprises one end extending out of the terminal wall of the positioning head and extending into the internal space of the isolating housing.

10. The motor as claimed in claim 2, wherein the wire receiving portion comprises a positioning head, wherein the lead wire is partially received in the positioning head, wherein the at least one second positioning portion is arranged on an outer periphery of the positioning head.

11. The motor as claimed in claim 10, wherein the positioning head is integrally formed with an outer periphery of the lead wire.

12. The motor as claimed in claim 2, wherein each of the at least one first positioning portion is in a form of a tongue, wherein each of the at least one second positioning portion is in a form of a notch, and wherein each of the at least one first positioning portion is engaged into a respective one of the at least one second positioning portion.

13. The motor as claimed in claim 1, wherein the isolating housing further comprises a partition mounted in the first housing part, wherein a circuit chamber is formed between the partition and the second housing part, wherein the circuit chamber communicates with the through-hole, and wherein the inner assembly comprises a circuit board coupled to the partition and located in the circuit chamber.

14. The motor as claimed in claim 1, further comprising a shaft extending through the first housing part and connected to the inner assembly, wherein the frame portion comprises rectangular or trapezoid cross sections parallel to an axis of the shaft.

* * * * *